United States Patent
Miyazaki

(10) Patent No.: US 12,235,603 B2
(45) Date of Patent: Feb. 25, 2025

(54) REPLACING PHOTOCONDUCTOR DRUMS ASSOCIATED WITH IMAGE FORMING APPARATUSES

(71) Applicant: TOSHIBA TEC KABUSHIKI KAISHA, Tokyo (JP)

(72) Inventor: Yasunari Miyazaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/941,166

(22) Filed: Sep. 9, 2022

(65) Prior Publication Data

US 2024/0085840 A1  Mar. 14, 2024

(51) Int. Cl.
*G03G 15/00* (2006.01)
*G06K 15/00* (2006.01)
*G06K 15/12* (2006.01)
*G03G 21/18* (2006.01)

(52) U.S. Cl.
CPC ....... *G03G 15/553* (2013.01); *G03G 15/5033* (2013.01); *G03G 15/5037* (2013.01); *G06K 15/12* (2013.01); *G06K 15/408* (2013.01); *G03G 21/1889* (2013.01); *G03G 2215/00071* (2013.01); *G03G 2221/1663* (2013.01); *G03G 2221/1823* (2013.01)

(58) Field of Classification Search
CPC .. G03G 15/553; G03G 15/55; G03G 15/5033; G03G 15/5037; G03G 15/751; G03G 21/1889; G03G 2215/00071; G03G 2221/1663; G03G 2221/1666; G03G 2221/1823; G06K 15/12; G06K 15/408
See application file for complete search history.

(56) References Cited

U.S. PATENT DOCUMENTS

| | | | | |
|---|---|---|---|---|
| 5,138,380 | A * | 8/1992 | Umeda | G03G 15/5037 399/48 |
| 2004/0265016 | A1* | 12/2004 | Kitani | G03G 15/0194 399/298 |
| 2006/0104649 | A1 | 5/2006 | Nagamochi et al. | |

(Continued)

FOREIGN PATENT DOCUMENTS

JP  2017-97032  6/2017

*Primary Examiner* — Arlene Heredia
*Assistant Examiner* — Laura Roth
(74) *Attorney, Agent, or Firm* — Amin, Turocy & Watson, LLP

(57) ABSTRACT

Presented is an image forming apparatus that includes a plurality of photoconductors, a sensor, a first memory, and a processor. The photoconductors include first and second photoconductors on which a toner image is formed in response to an image being formed. The sensor detects a physical amount that changes in response to a deterioration state of the first photoconductor. The first memory collects and stores a history of the physical amount and usage status information relating to a usage status of the first photoconductor. The processor performs a prediction of a lifespan of the second photoconductor and determination of a failure of the second photoconductor based on the history of the physical amount and the usage status information of the first photoconductor, and usage status information relating to a usage status of the second photoconductor.

20 Claims, 7 Drawing Sheets

(56) References Cited

U.S. PATENT DOCUMENTS

| | | | |
|---|---|---|---|
| 2012/0183310 A1* | 7/2012 | Asano | G03G 21/1671 |
| | | | 399/48 |
| 2012/0195604 A1* | 8/2012 | Kakigi | G03G 21/0094 |
| | | | 399/26 |
| 2013/0011147 A1* | 1/2013 | Kimura | G03G 15/5037 |
| | | | 399/26 |
| 2013/0251383 A1 | 9/2013 | Imazeki et al. | |
| 2014/0016951 A1* | 1/2014 | Takehisa | G03G 15/5037 |
| | | | 399/26 |
| 2016/0216175 A1 | 7/2016 | Iwasaki et al. | |
| 2017/0227895 A1* | 8/2017 | Shibuya | G03G 15/1675 |
| 2018/0150013 A1* | 5/2018 | Nii | G03G 15/553 |
| 2018/0173147 A1* | 6/2018 | Yoshida | G03G 15/5033 |
| 2019/0146369 A1* | 5/2019 | Mandai | G03G 15/0266 |
| | | | 399/50 |

* cited by examiner

FIG. 5

| DRUM ID | NUMBER OF TIMES OF REPLACEMENT | DATE AND TIME OF REPLACEMENT | TRAVEL DISTANCE | ONE-DAY AVERAGE TRAVEL DISTANCE | DETERIORATION CURVE NUMBER |
|---|---|---|---|---|---|
| C | 0 | 2021/aa/bb | XXXXX | xxx | 0 |
| M | 0 | 2021/aa/bb | XXXXX | xxx | 0 |
| Y | 0 | 2021/aa/bb | XXXXX | xxx | 0 |
| K | 1 | 2021/zz/ab | YYYY | yyy | 1 |

FIG. 6

| RULE NUMBER | POTENTIAL SENSOR ARRANGEMENT | | NUMBER OF TIMES OF REPLACEMENT OF PHOTOCONDUCTOR | | DETERIORATION CURVE NUMBER | |
|---|---|---|---|---|---|---|
| | COLOR UNIT | BLACK UNIT | COLOR UNIT | BLACK UNIT | COLOR UNIT | BLACK UNIT |
| 1 | ABSENT | PRESENT | m | m | m (BLACK) | m (BLACK) |
| 2 | ABSENT | PRESENT | m | m+n | m (BLACK) | m+n (BLACK) |
| 3 | ABSENT | PRESENT | m+n | m | m (BLACK) | m (BLACK) |

FIG. 7

| NUMBER OF TIMES OF REPLACEMENT | SURFACE POTENTIAL | TRAVEL DISTANCE | DATE AND TIME |
|---|---|---|---|
| 0 | xxx | aaa | 2021/aa/bb |
| | xxv | ccc | 2021/aa/cc |
| | ⋮ | ⋮ | ⋮ |
| | XXX | YYYYY | 2021/yy/yy |
| 1 | xxx | bbb | 2021/zz/ab |
| | xxu | ddd | 2021/zz/cd |
| | ⋮ | ⋮ | ⋮ |
| | XXY | YYYY | 2022/xx/xx |

FIG. 9

| COLUMN NUMBER | NUMBER OF TIMES OF REPLACEMENT OF PHOTOCONDUCTOR DRUM | | DETERIORATION CURVE NUMBER | |
|---|---|---|---|---|
| | COLOR UNIT | BLACK UNIT | COLOR UNIT | BLACK UNIT |
| 1 | 0 | 0 | 0 (BLACK) | 0 (BLACK) |
| 2 | 0 | 1 | 0 (BLACK) | 1 (BLACK) |
| 3 | 1 | 0 | 0 (BLACK) | 0 (BLACK) |
| 4 | 1 | 1 | 1 (BLACK) | 1 (BLACK) |
| 5 | 0 | 2 | 0 (BLACK) | 2 (BLACK) |
| 6 | 1 | 2 | 1 (BLACK) | 2 (BLACK) |
| 7 | 2 | 1 | 1 (BLACK) | 1 (BLACK) |

REPLACING PHOTOCONDUCTOR DRUMS ASSOCIATED WITH IMAGE FORMING APPARATUSES

FIELD

Embodiments described herein relate generally to an image forming apparatus.

BACKGROUND

An image forming apparatus placed in a work place may form a toner image on a photoconductor drum, transfer the toner image to a transfer body from the photoconductor drum, and further transfer the toner image to a medium such as paper from the transfer body. Such an image forming apparatus charges the photoconductor drum to form an electrostatic latent image on the photoconductor drum by using the laser or the like.

The photoconductor drum may be insufficiently charged due to deterioration. If the photoconductor drum is not sufficiently charged, an operator such as a serviceman replaces a photoconductor drum. Whether this photoconductor drum is not sufficiently charged can be known by the fact that a set lifespan count such as the information of the number of image formed sheets or the like is reached, that the image formed on a medium such as paper is defective, or the like. The determination of whether the lifespan count is reached is determination of lifespan prediction of a photoconductor drum, and determination of an image defect is determination of failure.

It is preferable to prepare a photoconductor drum for replacement in advance before the photoconductor drum fails or reaches lifespan so that an operation of forming an image is not delayed. For that purpose, if the image forming apparatus can predict replacement time of the photoconductor drum, the operator can arrange a photoconductor drum for replacement in advance, and thus can smoothly replace the photoconductor drum if the replacement is actually required.

Also, a technique of detecting a potential of a photoconductor drum by a potential sensor and predicting a lifespan of the photoconductor drum or determining a failure based on the detection result is developed.

In order to form a color image, a plurality of photoconductor drums may be mounted in the image forming apparatus. In such an image forming apparatus, it is required to provide potential sensors to photoconductor drums, respectively. That is, there is a problem in that a lifespan cannot be predicted or a failure cannot be determined with respect to photoconductor drums other than the photoconductor drum subjected to potential detection of the corresponding potential sensor.

DESCRIPTION OF THE DRAWINGS

FIG. 5 is a diagram illustrating a configuration example of a photoconductor status table;

FIG. 6 is a table illustrating an allocation rule for allocating the deterioration curve;

FIG. 7 is a diagram illustrating a configuration example of a deterioration curve storage unit;

FIG. 9 is a table illustrating an allocation example of the deterioration curve in conformation with an allocation rule illustrated in FIG. 6.

DETAILED DESCRIPTION

In general, according to one embodiment, an image forming apparatus includes a plurality of photoconductors, a sensor, a first memory, and a processor. The plurality of photoconductors include first and second photoconductors on which a toner image is formed in response to an image to be formed. The first photoconductor is used for forming an image of a first form, and the second photoconductor or both of the first and second photoconductors are used for forming an image of a second form different from the first form. The sensor is disposed in the first photoconductor and detects a physical amount that changes in response to a deterioration state of the first photoconductor. The first memory collects and stores history of the physical amount and usage status information relating to a usage status of the first photoconductor if the physical amount is detected. The processor performs at least one of prediction of a lifespan of the second photoconductor and determination of a failure of the second photoconductor based on the history of the physical amount and the usage status information of the first photoconductor collected and stored in the first memory, and usage status information relating to a usage status of the second photoconductor at a present time point.

Hereinafter, an embodiment is described with reference to the drawings.

An image forming apparatus according to the embodiment forms an image on a medium such as paper by using a toner. The image forming apparatus forms a toner image on a photoconductor drum and transfers the toner image to a transfer body such as a transfer belt. The image forming apparatus transfers the toner image transferred to the transfer body to a medium such as paper. The image forming apparatus fixes the toner to the medium by heating the medium to which the toner image is transferred.

Figure 1:
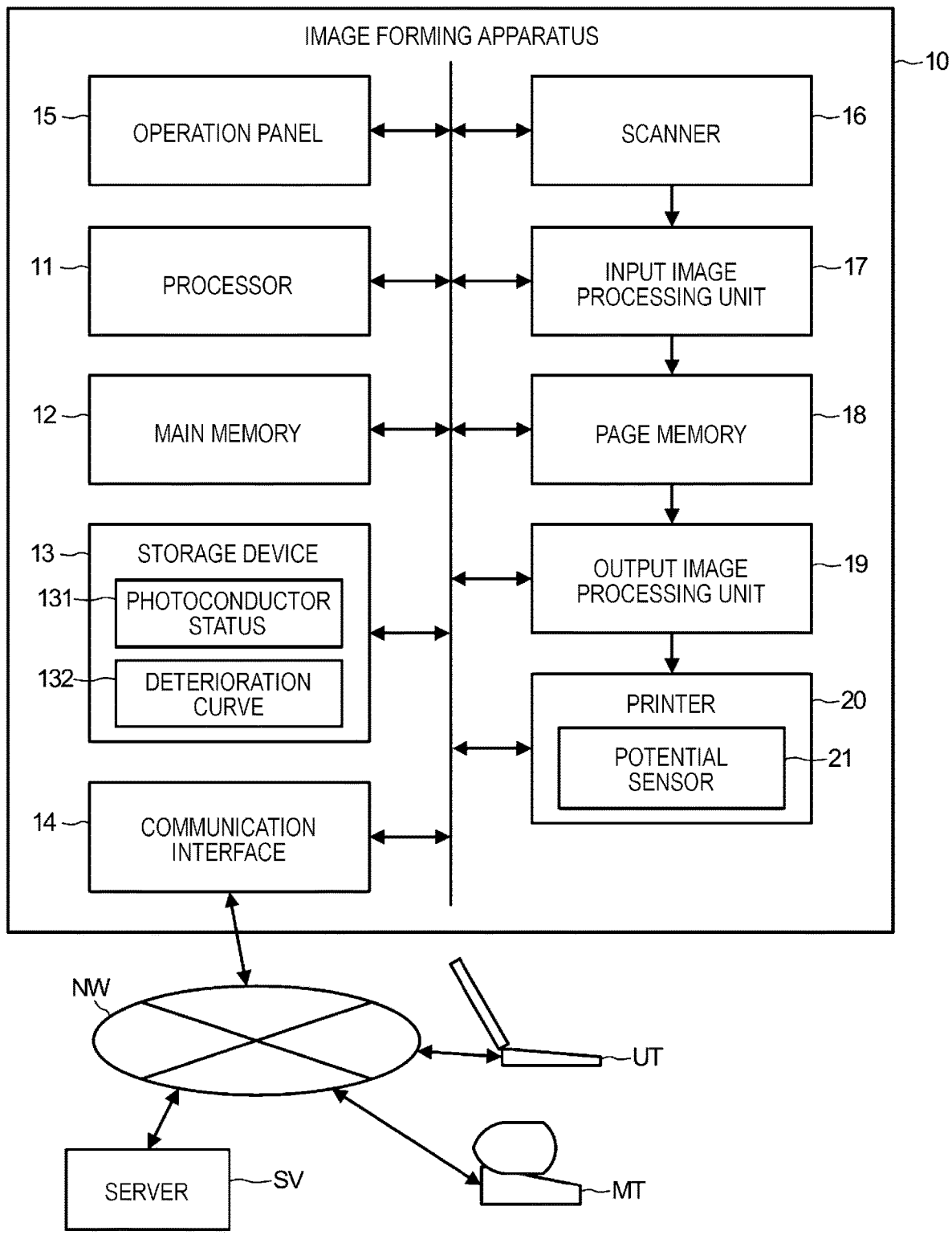
FIG. 1 is a block diagram illustrating a configuration example of an image forming apparatus according to an embodiment.

FIG. 1 is a block diagram illustrating a configuration example of an image forming apparatus 10 according to the embodiment.

As illustrated in FIG. 1, the image forming apparatus 10 placed at a work place includes a processor 11, a main memory 12, a storage device 13, a communication interface 14, an operation panel 15, a scanner 16, an input image processing unit 17, a page memory 18, an output image processing unit 19, and a printer 20. These units are connected to each other via a data bus.

Further, in addition to the configurations illustrated in FIG. 1, the image forming apparatus 10 may include a configuration as needed, and a specific configuration may be omitted from the configurations illustrated in FIG. 1.

The processor 11 has a function of controlling the entire operations of the image forming apparatus 10. The processor 11 may include an internal memory and various interfaces. The processor 11 embodies various processes by executing programs stored in the internal memory, the storage device 13, or the like in advance.

In addition, a part of the various functions embodied by executing the programs by the processor 11 may be embodied by hardware circuits of various formats including integrated circuits such as an application specific integrated circuit (ASIC), a digital signal processor (DSP), a field-programmable gate array (FPGA), and a graphics processing unit (GPU). In this case, the processor 11 controls functions performed by the hardware circuits.

The main memory 12 is a volatile memory. The main memory 12 is a working memory or a buffer memory. The main memory 12 stores various application programs based on a command from the processor 11. In addition, the main memory 12 may store data required for the execution of the application programs or execution results of the application programs.

The storage device 13 is a nonvolatile memory to which data can be written and rewritten. The storage device 13 is configured, for example, with a hard disk drive (HDD), a solid state drive (SSD), a flash memory, or the like. The storage device 13 stores a control program, an application, various items of data, or the like in response to the operational use of the image forming apparatus 10. For example, the storage device 13 stores a photoconductor status table 131, a deterioration curve storage unit 132, and the like.

The photoconductor status table 131 stores usage status information relating to respective usage statuses of the plurality of photoconductor drums described below. Details of this photoconductor status table 131 are described below.

The deterioration curve storage unit 132 collects and stores information for generating prediction information to be used for predicting respective lifespans of the plurality of photoconductor drums. Details of the deterioration curve storage unit 132 are described below.

The communication interface 14 is an interface for communication with an external device on a network NW. The communication interface 14 is used for communication with a user terminal UT, an administrator terminal MT, a server device SV, and the like placed at a work place, via the network NW such as an intra-office local area network (LAN). The communication interface 14 is configured, for example, as a LAN connector. In addition, the communication interface 14 may perform wireless communication with the other apparatus according to the standards such as Bluetooth (Registered Trademark) or Wi-fi (Registered Trademark).

The operation panel 15 receives various instructions by an operator of the image forming apparatus 10. The operation panel 15 transmits a signal indicating an instruction input by the operator to the processor 11. The operation panel 15 includes, for example, a keyboard, ten keys, and a touch panel, as operation units.

In addition, the operation panel 15 displays various kinds of information to the operator of the image forming apparatus 10. That is, the operation panel 15 displays a screen for indicating various kinds of information based on the signal from the processor 11. The operation panel 15 includes, for example, a monitor such as a liquid crystal display, as a display unit.

The scanner 16 optically scans a document and reads an image of the document as image data. The scanner 16 reads the document as a color image. The scanner 16 is configured with sensor arrays formed in a main scanning direction. The scanner 16 moves the sensor arrays in a sub-scanning direction and reads the entire document.

The input image processing unit 17 processes the image data read by the scanner 16. In addition, the input image processing unit 17 may process the image data from a unit other than the scanner 16. For example, the input image processing unit 17 may process image data sent from the user terminal UT such as a PC or a smart phone. In addition, though not illustrated in FIG. 1, if the image forming apparatus 10 includes a reader of a storage medium such as a USB memory, the input image processing unit 17 may process image data read from the storage medium.

The page memory 18 stores image data processed by the input image processing unit 17.

The output image processing unit 19 processes the image data stored by the page memory 18 so that the printer 20 can print the image data on the paper.

The printer 20 prints the image data processed by the output image processing unit 19 on the paper based on the control of the processor 11. The printer 20 prints the image data on the paper, for example, by an electrophotographic method. In addition, the printer 20 is configured with a transfer body, rollers for driving the transfer body, a photoconductor drum, a potential sensor 21, and the like. Details of the printer 20 are described below.

The potential sensor 21 measures a potential (a charging potential) charged on one surface among the plurality of photoconductor drums described below. Here, the potential sensor 21 measures a dark potential of the photoconductor drum. The potential sensor 21 outputs the sensor signal indicating the charging potential to the processor 11.

Next, the printer 20 is described.

Figure 2:
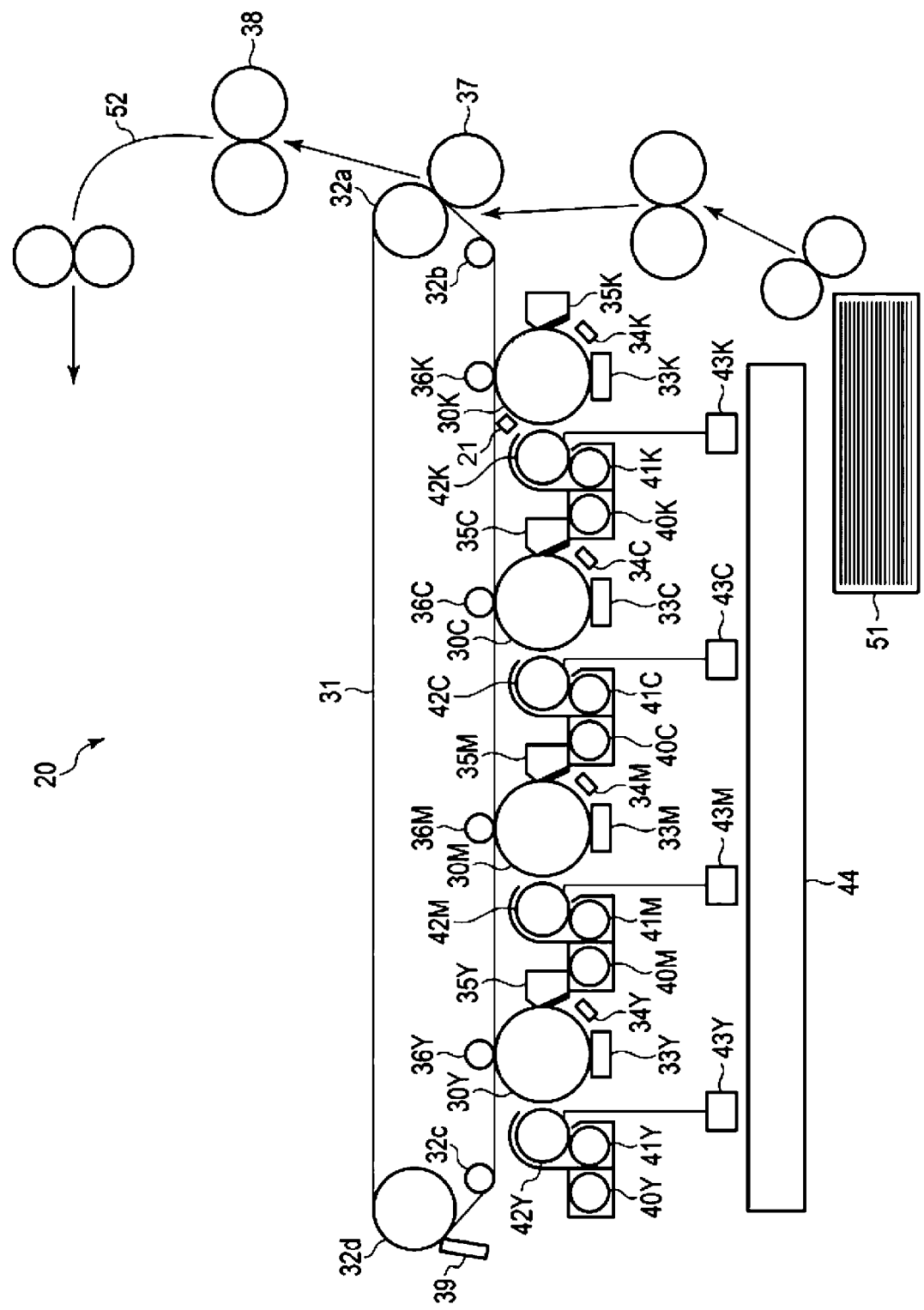
FIG. 2 is a diagram illustrating a configuration example of a printer.

FIG. 2 is a diagram illustrating a configuration example of the printer 20. As illustrated in FIG. 2, the printer 20 includes photoconductor drums 30K, 30C, 30M, and 30Y, a transfer body 31, rollers 32a, 32b, 32c, and 32d, chargers 33K, 33C, 33M, and 33Y, static eliminators 34K, 34C, 34M, and 34Y, photoconductor cleaners 35K, 35C, 35M, and 35Y, primary transfer rollers 36K, 36C, 36M, and 36Y, a secondary transfer roller 37, a fixer 38, a transfer body cleaner 39, developers 40K, 40C, 40M, and 40Y, stirrers 41K, 41C, 41M, and 41Y, developing rollers 42K, 42C, 42M, and 42Y, voltage applying units 43K, 43C, 43M, and 43Y, an exposure unit 44, a paper feed cassette 51, a conveyance path 52, and the like.

The transfer body 31 is an intermediate transfer body. The transfer body 31 is formed in a belt shape. That is, the transfer body 31 is formed in a ring shape with a predetermined width.

The rollers 32a to 32d are rollers for driving the transfer body 31. The rollers 32a to 32d are formed inside the transfer body 31. The rollers 32a to 32d pull the transfer body 31 from the inside with a predetermined tension to form a planar shape. The rollers 32a to 32d are rotated by a driving force from the driving unit. The rollers 32a to 32d drive the transfer body 31 by rotation. In addition, some of the rollers 32a to 32d may be passively rotated.

The printer 20 includes photoconductor drums, chargers, static eliminators, photoconductor cleaners, primary transfer rollers, developers, stirrers, developing rollers, voltage applying units, and laser units in the exposure unit 44 for colors of the toners. Here, the printer 20 includes the photoconductor drums, the chargers, the static eliminators, the photoconductor cleaners, the primary transfer rollers, the developers, the stirrers, the developing rollers, the voltage applying units, and the laser units with respect to the toners of cyan (C), magenta (M), yellow (Y), and black (K), respectively.

That is, the printer 20 includes the photoconductor drums 30Y, 30M, 30C, and 30K as the photoconductor drums. In addition, the printer 20 includes the chargers 33Y, 33M, 33C, and 33K as the chargers. In addition, the printer 20 includes the static eliminators 34Y, 34M, 34C, and 34K, as the static eliminators. In addition, the printer 20 includes the photoconductor cleaners 35Y, 35M, 35C, and 35K, as the photoconductor cleaners.

In addition, the printer 20 includes the primary transfer rollers 36Y, 36M, 36C, and 36K, as the primary transfer rollers. In addition, the printer 20 includes the developers 40Y, 40M, 40C, and 40K, as the developers. In addition, the printer 20 includes the stirrers 41Y, 41M, 41C, and 41K, as the stirrers. In addition, the printer 20 includes the developing rollers 42Y, 42M, 42C, and 42K, as the developing rollers. In addition, the printer 20 includes the voltage applying units 43Y, 43M, 43C, and 43K, as the voltage applying units.

Here, representatively, the photoconductor drum 30K, the charger 33K, the static eliminator 34K, the photoconductor cleaner 35K, the primary transfer roller 36K, the developer 40K, the stirrer 41K, the developing roller 42K, and the voltage applying unit 43K are described.

The developer 40K is a container that contains a developer including a toner and a carrier having magnetism. The developer 40K receives the toner sent out from a toner cartridge. The developer is contained in the developer 40K at the time of production or at the start of use.

The stirrer 41K is formed in the developer 40K. The stirrer 41K stirs the developer in the developer 40K. The stirrer 41K is configured with a screw for stirring the developer and a motor for rotating the screw.

In addition, the developing roller 42K is formed in the developer 40K. The developing roller 42K attracts the developer by a built-in magnet and rotates in the developer 40K, to attach the developer to the surface. The developing roller 42K rotates by a motor or the like. The developing roller 42K is one of the rotation members for forming the toner image on the transfer body 31.

The voltage applying unit 43K applies a development bias to the developing roller 42K according to the control of the processor 11. For example, the voltage applying unit 43K applies the development bias to the developing roller 42K. The toner of the developer attached to the developing roller 42K is attached to the photoconductor drum 30K due to an electric field generated by a development bias and a drum potential, to form the toner image.

The charger 33K charges the surface of the photoconductor drum 30K with a constant potential. The charger 33K charges the photoconductor drum 30K by charging a predetermined voltage (a grid voltage) according to the control from the processor 11.

The photoconductor drum 30K is a photoconductor including a cylindrical drum and a photosensitive layer formed on the outer peripheral surface of the drum. The photoconductor drum 30K rotates at a constant speed by the power transmitted from the motor. The photoconductor drum 30K is one of the rotation members for forming the toner image on the transfer body 31.

The photoconductor drum 30K is charged by the charger 33K. The photoconductor drum 30K is irradiated with a laser from the laser unit in the exposure unit 44 in a charged state while rotating. As a result, a bright electrostatic latent image is formed by the laser on the photoconductor drum 30K.

The primary transfer roller 36K is formed at a position facing the photoconductor drum 30K with the transfer body 31 interposed therebetween. The primary transfer roller 36K brings the transfer body 31 into contact with the photoconductor drum 30K. The primary transfer roller 36K transfers the toner image formed on the photoconductor drum 30K to the transfer body 31. The photoconductor drum 30K is one of the rotation members for forming the toner image. The primary transfer roller 36K is one of the rotation members for forming the toner image on the transfer body 31.

The photoconductor cleaner 35K is configured with a blade or the like that is in contact with the surface of the photoconductor drum 30K. The photoconductor cleaner 35K removes a toner remaining on the surface of the photoconductor drum 30K by using the blade.

The static eliminator 34K removes the charging potential remaining in the photoconductor drum 30K.

The paper feed cassette 51 is a cassette that contains paper as the medium. The paper feed cassette 51 has a structure that can supply paper from the outside of the housing of the image forming apparatus 10. For example, the paper feed cassette 51 has a structure that can be pulled out from the housing.

The conveyance path 52 conveys paper. For example, the conveyance path 52 takes out paper from the paper feed cassette 51 one sheet by one. For example, the conveyance path 52 is configured with a roller, a conveyance belt, and the like.

The secondary transfer roller 37 transfers the toner image formed on the transfer body 31 to the paper. As illustrated in FIG. 2, the secondary transfer roller 37 is formed at a position facing the roller 32a with the transfer body 31 interposed therebetween. The secondary transfer roller 37 transfers the toner image on the transfer body 31 to the paper conveyed by the conveyance path 52.

The fixer 38 is formed downstream of the secondary transfer roller 37 in the paper conveyance direction. The fixer 38 fixes the toner image transferred to the paper. The fixer 38 fixes the toner image to the paper by heating the toner image to the fixing temperature. For example, the fixer 38 is configured with a heater or the like.

The transfer body cleaner 39 is configured with a blade that is in contact with the surface of the transfer body 31. The transfer body cleaner 39 removes the toner remaining on the surface of the transfer body 31 by using the blade.

The exposure unit 44 irradiates the photoconductor drums 30K, 30C, 30M, and 30Y with the laser according to the control from the processor 11. The exposure unit 44 forms electrostatic latent images on the photoconductor drums 30K, 30C, 30M, and 30Y by irradiating the photoconductor drums 30K, 30C, 30M, and 30Y with the laser. For example, the exposure unit 44 is configured with a laser unit that is an irradiation device that applies the laser, a polygon mirror that reflects the laser, and the like.

In the above configuration, the printer 20 forms the toner image on the transfer body 31. The printer 20 transfers the toner image formed on the transfer body 31 onto the paper by using the secondary transfer roller 37. The printer 20 heats the paper onto which the toner image is transferred by using the fixer 38 to fix the toner image to the paper. The printer 20 ejects the paper to which the toner image is fixed, to the outside by using the conveyance path 52.

The potential sensor 21 measures the charging potential of the photoconductor drum 30K among the plurality of photoconductor drums 30K, 30C, 30M, and 30Y. The potential sensor 21 measures the charging potential of the photoconductor drum 30K after being charged by the charger 33K. The potential sensor 21 is installed downstream of the charger 33K. Here, the downstream refers to a downstream in a direction in which the photoconductor drum 30K is driven.

Figure 3:
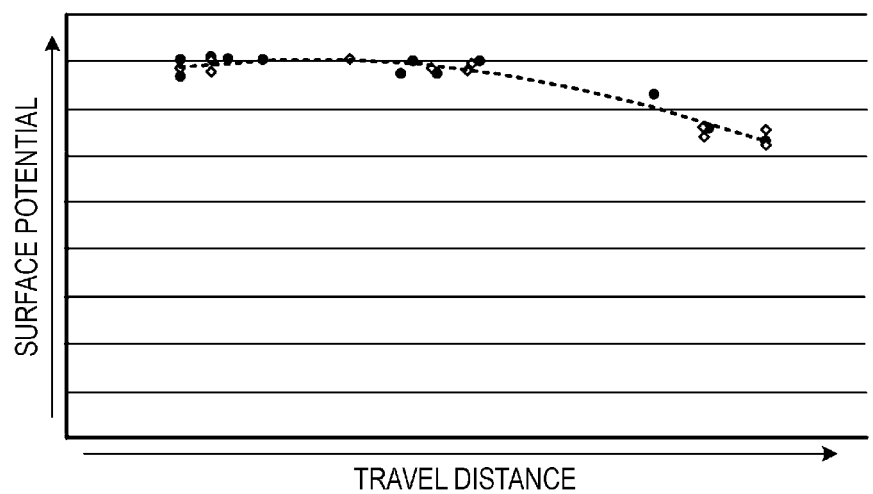
FIG. 3 is a graph illustrating a relationship between a travel distance and a surface potential of a photoconductor drum.

FIG. 3 is a graph showing the relationship between the travel distance and the surface potential of the photoconductor drum. FIG. 3 shows measurement results by the plurality of image forming apparatuses in which the potential sensors 21 are disposed not only on the photoconductor drum 30K for the toner of black (K) but also on the photoconductor drum 30C, 30M, or 30Y for toners of cyan (C), magenta (M) or yellow (Y). The surface potential is an absolute value of the charging potential detected by the potential sensor 21 if the charger charges the photoconductor drum at a predetermined grid voltage (for example, −900 V). Here, the charging potential is a dark potential. The travel distance is a value obtained by multiplying the time if the photoconductor drum rotates by the coefficient in response to the rotation speed of the photoconductor drum. In FIG. 3, measurement results with respect to the photoconductor drum 30K are plotted with black circles, and measurement results with respect to the photoconductor drum 30C, 30M, or 30Y are plotted with outlined rhombuses.

As illustrated in FIG. 3, if the value of the travel distance is small, the charging potential becomes large. As the value of the travel distance increases, the charging potential decreases due to the deterioration of the photoconductor drum. In this manner, the surface potential of the photoconductor drum gradually decreases in response to the travel distance. That is, the photoconductor drum may not be sufficiently charged due to the deterioration.

Figure 4:
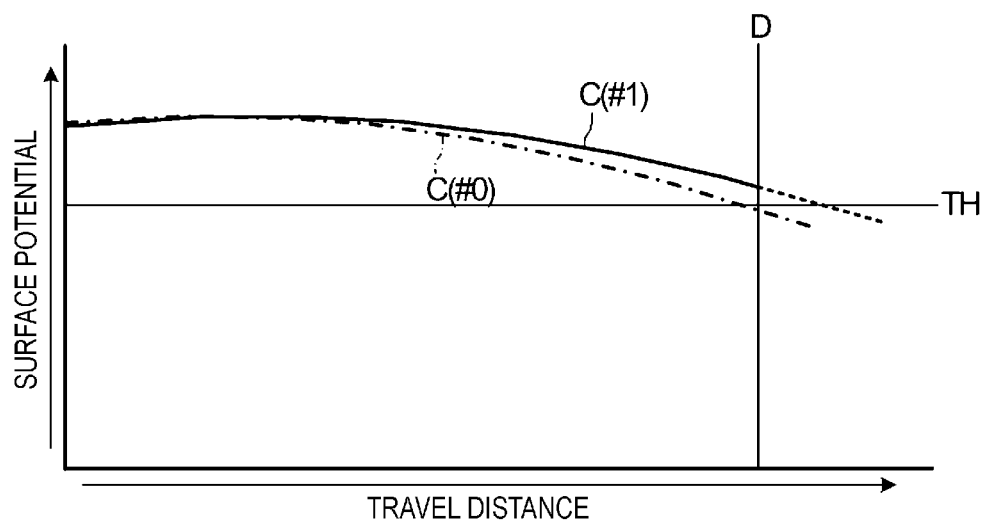
FIG. 4 is a graph illustrating an example of a deterioration curve.

The image forming apparatus 10 according to the embodiment collects and stores the history of the surface potential of one photoconductor drum 30K detected by the potential sensor 21 in the deterioration curve storage unit 132, to generate the deterioration curve from the relationship between the travel distance and the surface potential. FIG. 4 is a graph showing the example of the deterioration curve. The deterioration curve is formed as another deterioration curve whenever the photoconductor drum 30K is replaced. FIG. 4 illustrates a deterioration curve C (#0) if the replacement is not performed, and a deterioration curve C (#1) after the replacement is performed once. In FIG. 4, the deterioration curve C (#0) if the replacement is not performed becomes a curve by actual data until the photoconductor drum 30K is replaced. In contrast, the deterioration curve C (#1) after the replacement is performed once, which is the deterioration curve with respect to the photoconductor drum 30K mounted to the image forming apparatus 10 at a present time point includes the curve by the actual data to a current travel distance D and also includes a predicted curve after the current travel distance D which is obtained by extending the curve. In FIG. 4, the predicted curve after the current travel distance D is illustrated with a broken line.

If the deterioration curve with respect to the photoconductor drum 30K mounted on the image forming apparatus 10 at a present time point crosses a failure determination threshold value TH (for example, 700 V) relating to the charging potential, the image forming apparatus 10 according to the embodiment determines that it is the replacement time of the corresponding photoconductor drum 30K, that is, the corresponding photoconductor drum 30K fails. In addition, the image forming apparatus 10 according to the embodiment predicts the travel distance at which the deterioration curve including a predicted value with respect to the photoconductor drum 30K mounted on the image forming apparatus 10 at a present time point crosses the failure determination threshold value TH at a future time point, as a lifespan of the corresponding photoconductor drum 30K. In addition, as the failure determination threshold value TH, a value if the surface potential of the photoconductor drum if a predetermined bias is applied to the charging unit decreases or increases, and the degree of decrease or increase thereof does not cause image defects or device abnormalities is set.

Since the temperature and humidity environment conditions, high pressure application conditions, paper passing conditions, and the like are almost the same, the deterioration of the photoconductor drums 30K, 30C, 30M, and 30Y disposed in the same machine traces the same deterioration curve, and the same deterioration curve relates to the travel distances of the photoconductor drums. Accordingly, the deterioration curve with respect to the photoconductor drum 30K in which the potential sensor 21 is disposed can be used as the deterioration curves of the other photoconductor drums 30C, 30M, and 30Y not having potential sensors. If the image forming apparatus 10 is operated for printing, for example, in a color mode, all of the photoconductor drums 30K, 30C, 30M, and 30Y operate, or the photoconductor drums 30C, 30M, and 30Y except for the photoconductor drum 30K operate, and thus the respective travel distances are added up. In contrast, if the image forming apparatus 10 is operated for printing in a monochrome mode, since only the photoconductor drum 30K operates, and the photoconductor drums 30C, 30M, and 30Y do not operate, the travel distance of the photoconductor drum 30K differs from those of the photoconductor drums 30C, 30M, and 30Y. Also in this case, the travel distances of the photoconductor drums 30C, 30M, and 30Y in which the potential sensors are not disposed are applied to the deterioration curve, the degree of deterioration can be found.

Therefore, with respect to the other photoconductor drums 30C, 30M, and 30Y in which the potential sensors 21 are not disposed, the image forming apparatus 10 according to the embodiment can determine failures or predict the lifespans thereof by applying the travel distance to the deterioration curve of the photoconductor drum 30K.

In this manner, the image forming apparatus 10 according to the embodiment uses the deterioration curve as the prediction information that is used for predicting the lifespans of the plurality of photoconductor drums 30K, 30C, 30M, and 30Y. Also, the image forming apparatus 10 according to the embodiment includes the photoconductor status table 131 and the deterioration curve storage unit 132.

FIG. 5 is a diagram illustrating the configuration example of the photoconductor status table 131. As illustrated in FIG. 5, the photoconductor status table 131 stores the numbers of times of replacement, replacement date and time, travel distances, one-day average travel distances, and deterioration curve numbers in association with drum IDs.

The drum IDs are identifiers for identifying the photoconductor drums 30K, 30C, 30M, and 30Y. In this example, the drum IDs are "K" for the photoconductor drum 30K, "C" for the photoconductor drum 30C, "M" for the photoconductor drum 30M, and "Y" for the photoconductor drum 30Y.

The number of times of replacement are the number of times of replacement of the photoconductor drum indicated by the drum ID. In addition, the replacement date and time is date and time when the replacement is performed. The processor 11 updates the numbers of times of replacement and the replacement date and time whenever the photoconductor drums are replaced. In addition, if the photoconductor drums are not replaced, the replacement date and time is the date and time when the photoconductor drum is initially driven.

The travel distances are travel distances of the photoconductor drums indicated by the drum IDs. As described above, the travel distance is a value obtained by multiplying the time when the photoconductor drum rotates by the coefficient in response to the rotation speed of the photoconductor drum. The processor 11 calculates the travel distance in response to the driving of the photoconductor drum, adds the calculated travel distance to the value of the travel distance stored in the photoconductor status table 131, and updates and stores the added result as the value of the travel distance thereof. In addition, the value of the travel distance is reset whenever the photoconductor drum is replaced. Of course, the value of the total travel distance or the value of the travel distance at the time of replacement may also be stored separately.

The one-day average travel distances are travel distances for one day of the photoconductor drums indicated by the drum IDs. The processor 11 can calculate and update the one-day average travel distance at any time. The any time may be set as once a day, once a week, or the like, by a timer, or may be a timing of detecting the surface potential of the photoconductor drum 30K by the potential sensor 21. The processor 11 can obtain the one-day average travel distance by dividing the travel distance stored in the photoconductor status table 131 that is reset whenever the photoconductor drum is replaced by difference in the number of days between the present date and time and the replacement date and time stored in the photoconductor status table 131. In addition, as the travel distance per day, since the average travel distances may differ depending on the week or month, travel distances of every day may be stored, so that the one-day average travel distance per week or month can be calculated.

The deterioration curve number is an identification number for specifying the deterioration curve used for the prediction of a lifespan or the determination of a failure. The deterioration curve number specifies the number of times of replacement of the photoconductor drum 30K in which the potential sensor 21 is disposed. If any one of the photoconductor drums 30K, 30C, 30M, and 30Y is replaced, the processor 11 determines the deterioration curve used by the replaced photoconductor drum according to the allocation rule of the deterioration curve. Also, the processor 11 updates the deterioration curve number with respect to the drum ID of the corresponding photoconductor drum in the photoconductor status table 131 to the deterioration curve number for specifying the determined deterioration curve.

If the photoconductor drum 30C, 30M, or 30Y in which the potential sensor 21 is not disposed is replaced, the deterioration curve obtained from the surface potential detection result with respect to the photoconductor drum 30K is valid since the photoconductor drums 30C, 30M, and 30Y are driven together with the photoconductor drum 30K in which the potential sensor 21 is disposed. In addition, if the photoconductor drum 30K in which the potential sensor 21 is disposed is replaced, the detection result of the photoconductor surface potential by the potential sensor 21 is reset, and a new deterioration curve is carved. In this case, the photoconductor drums 30C, 30M, and 30Y which are driven together with the photoconductor drum 30K before replacement and in which the potential sensors 21 are not disposed are deteriorated according to the deterioration curve of the previous time, and thus the degree of the deterioration is predicted from the deterioration curve of the previous time.

The deterioration curve obtained from the detection results of the surface potential by the potential sensor 21 of the photoconductor drum 30K in which the potential sensor 21 is disposed is managed by the number of times of replacement of the corresponding photoconductor drum 30K. If the photoconductor drum 30K is replaced, the number of times of replacement is counted up by one. Together with this, the deterioration curve is reset, plotting of a new deterioration curve starts. Internally, as described below, the deterioration curve of the number of times of replacement of the previous time is stored in the deterioration curve storage unit 132, deterioration curves managed by the numbers of times of replacement are stored.

As the deterioration curve of the photoconductor drum 30C, 30M, or 30Y in which the potential sensor 21 is not disposed, the deterioration curve managed by the number of times of replacement of the photoconductor drum 30K in which the potential sensor 21 is disposed is used. Details thereof are as follows.

If the photoconductor drum 30K in which the potential sensor 21 is disposed is mounted, that is, at the time of replacement, the number of times of replacement at that time point is allocated to the deterioration curve that is plotted from now on, and the deterioration curve is reset, and new plotting starts.

If the photoconductor drum 30C, 30M, or 30Y in which the potential sensor 21 is not disposed is mounted, that is, at the time of replacement, the number of times of replacement of the photoconductor drum 30K in which the potential sensor 21 is disposed at that time point is stored, the deterioration curve associated with the number of times of replacement is allocated with the corresponding photoconductor drum 30C, 30M, or 30Y. Here, the allocation of the number of times of replacement is allocation associated with the deterioration curve and does not mean the rewriting of the number of times of replacement of the photoconductor drum 30C, 30M, or 30Y in which the potential sensor 21 is not disposed.

FIG. 6 is a table showing the allocation rule for allocating such a deterioration curve. In FIG. 6, the black unit indicates the photoconductor drum 30K, and the color unit indicates the photoconductor drum 30C, 30M, or 30Y. FIG. 6 is an example in which the potential sensor 21 is disposed only in the black unit. Here, the number of times of replacement of the photoconductor is set as m.

Rule 1: If the number of times of replacement of the black unit that is a unit with a potential sensor is m, and the number of times of replacement of the color unit that is a unit without a potential sensor is m, m is also applied to the deterioration curve number. That is, if the number of times of replacement of the photoconductor drum 30K is the same as that of the photoconductor drum 30C, 30M, or 30Y, the number m of times of replacement of the black unit is set as the deterioration curve number.

Rule 2: If the number of times of replacement of the black unit that is a unit with a potential sensor is m+n (n is an integer), and the number of times of replacement of the color unit that is a unit without a potential sensor is m, with respect to the deterioration curve, m+n is applied for the black unit that is the unit with the potential sensor, and m is applied for the color unit that is the unit without the potential sensor. For example, if the photoconductor drum 30K is replaced, and the number of times of replacement becomes m+1, the deterioration curve number of the black unit is updated to m+1, and the deterioration curve number of the color unit that is the unit without the potential sensor is m without change. In addition, thereafter, if any one of the photoconductor drums 30C, 30M, and 30Y is replaced, Rule 1 is applied to the replaced photoconductor drum, and Rule 2 is maintained for the photoconductor drums of the other color units.

Rule 3: If the number of times of replacement of the black unit that is the unit with the potential sensor is m, and the number of times of replacement of the color unit that is the unit without the potential sensor is m+n (n is an integer), m is applied to the deterioration curve number. For example, even if any one of the photoconductor drums 30C, 30M, and 30Y is replaced prior to the photoconductor drum 30K, and the number of times of replacement becomes m+1, the deterioration curve of the deterioration curve number m+1 of the black unit cannot be generated yet, and thus the deterioration curve number m is maintained without change. In addition, if the photoconductor drum 30K of the black unit is replaced thereafter, Rule 1 is applied to the photoconductor drum replaced before, and Rule 2 is maintained for the photoconductor drums of the other color units.

FIG. 7 is a diagram illustrating a configuration example of the deterioration curve storage unit 132. The deterioration curve storage unit 132 stores the surface potential that is the detection result of the potential sensor 21, the travel distance of the photoconductor drum 30K at the time of the detection, and the detection date and time in association with the number of times of replacement. In addition, FIG. 7 illustrates an example of a status where the photoconductor drum 30K is replaced once.

Next, the operation example of the image forming apparatus 10 is described. In addition, the processor 11 of the image forming apparatus 10 can perform the following operations by executing programs stored in the storage device 13 or the like.

Figure 8:
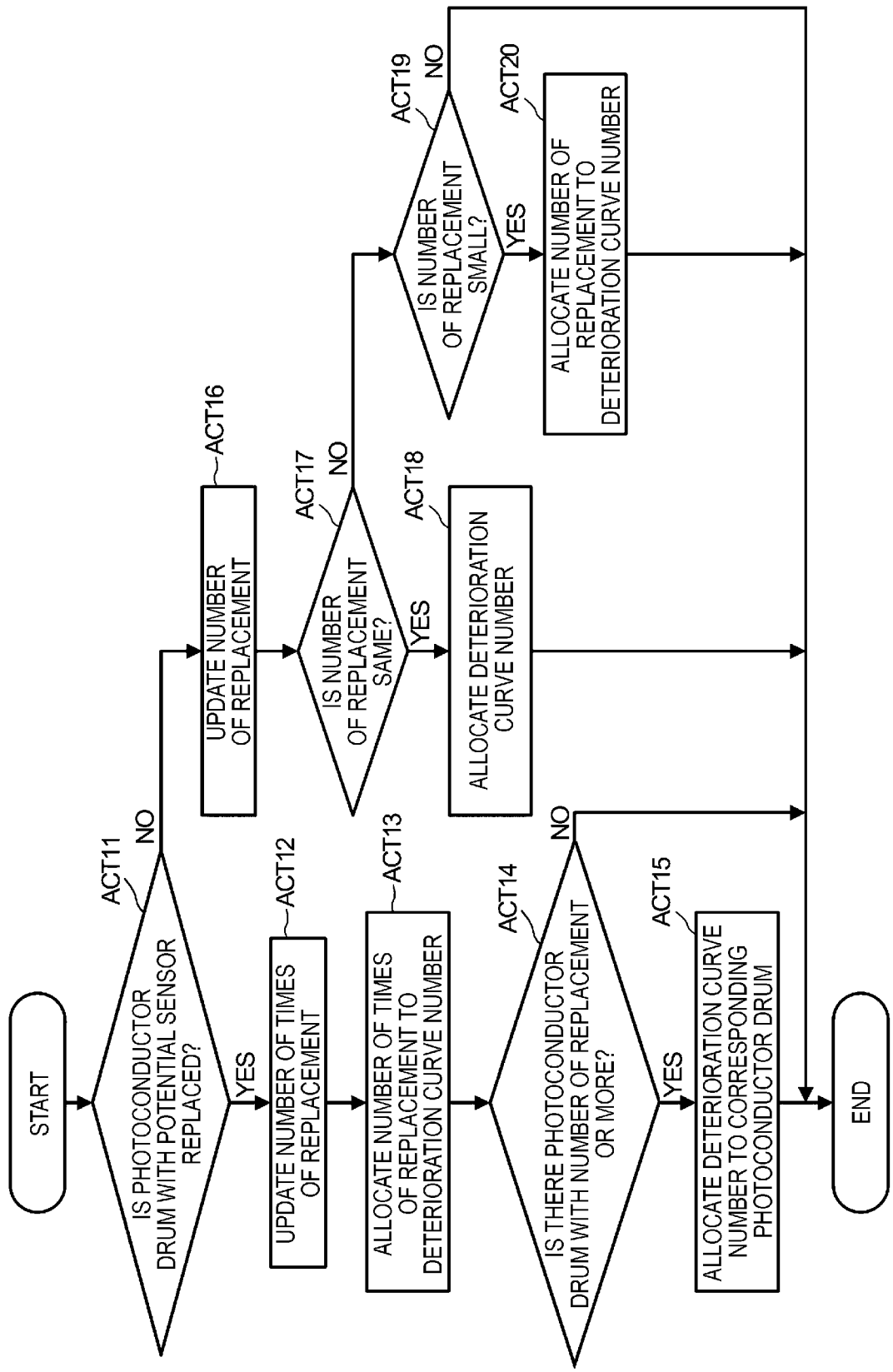
FIG. 8 is a flowchart showing an operation example of a deterioration curve allocation process of the image forming apparatus.

FIG. 8 is a flowchart showing an operation example of a deterioration curve allocation process. If any one of the photoconductor drums 30K, 30C, 30M, and 30Y is replaced, the processor 11 starts an operation shown in this flowchart.

First, the processor 11 determines whether the photoconductor drum 30K with the potential sensor 21 is replaced (ACT 11). That is, the processor 11 determines whether the replaced photoconductor drum is the photoconductor drum 30K in which the potential sensor 21 is disposed.

If it is determined that the photoconductor drum 30K with the potential sensor 21 is replaced (YES in ACT 11), the processor 11 updates the number of times of replacement of the photoconductor drum 30K (ACT 12). That is, the processor 11 sets the number of times of replacement in the record of the drum ID "K" of the photoconductor status table 131 as "+1". In addition, at this time, the processor 11 sets the replacement date and time in the record of the drum ID "K" of the photoconductor status table 131 as the present date and time.

Also, the processor 11 allocates the updated number of times of replacement to the deterioration curve number of the photoconductor drum 30K with the potential sensor 21 (ACT 13). That is, the processor 11 sets the updated number of times of replacement as the deterioration curve number in the record of the drum ID "K" of the photoconductor status table 131.

Here, the processor 11 determines whether there is a photoconductor drum of which the number of times of replacement is equal to or more than the number of times of replacement updated in ACT 12 among the photoconductor drums 30C, 30M, and 30Y in which the potential sensors 21 are not disposed (ACT 14). That is, the processor 11 compares the value of the number of times of replacement in the record of the drum ID "K" of the photoconductor status table 131 with the values of the numbers of times of replacement in the record of the other drum IDs. If it is determined that there is no photoconductor drum of which the number of times of replacement is equal to or more than the updated number of times of replacement (NO in ACT 14), the processor 11 ends the operation shown in this flowchart.

In contrast, if it is determined that there is a photoconductor drum of which the number of times of replacement is equal to or more than the updated number of times of replacement (YES in ACT 14), the processor 11 allocates a new deterioration curve number to the corresponding photoconductor drum (ACT 15). That is, the processor 11 sets the value of the deterioration curve number allocated in ACT 13 to the deterioration curve number in the record of the drum ID of the photoconductor status table 131 corresponding to the photoconductor drum in which the corresponding potential sensor 21 is not disposed. This is a process operation in conformation with Rule 1 or Rule 3 described above. Thereafter, the processor 11 ends the operation shown in this flowchart.

In addition, if it is determined that the photoconductor drum 30K with the potential sensor 21 is not replaced in ACT 11 (NO in ACT 11), the processor 11 updates the number of times of replacement of the replaced photoconductor drum 30C, 30M, or 30Y in which the potential sensor 21 is not disposed (ACT 16). That is, the processor 11 sets the number of times of replacement in the corresponding record of the drum ID of the photoconductor status table 131 as "+1". In addition, at this time, the processor 11 sets the replacement date and time in the corresponding record of the photoconductor status table 131 as the present date and time.

Here, the processor 11 determines whether the updated number of times of replacement is the same as the number of times of replacement of the photoconductor drum 30K in which the potential sensor 21 is disposed (ACT 17). That is, the processor 11 compares the value of the replacement in the record of the corresponding drum ID of the photoconductor status table 131 with the value of the number of times of replacement in the record of the drum ID "K".

Here, if the numbers of times of replacement are the same (YES in ACT 17), the processor 11 allocates the deterioration curve number of the photoconductor drum 30K in which the potential sensor 21 is disposed with respect to the replaced photoconductor drum 30C, 30M, or 30Y in which the potential sensor 21 is not disposed (ACT 18). That is, the processor 11 sets the value of the deterioration curve number of the photoconductor drum 30K to the deterioration curve number in the record of the corresponding drum ID of the photoconductor status table 131. This is a process operation in conformation with Rule 1 described above. Thereafter, the processor 11 ends the operation shown in this flowchart.

In contrast, if the numbers of times of replacement are not the same (NO in ACT 17), the processor 11 determines whether the number of times of replacement that is updated in ACT 16 is less than the number of times of replacement of the photoconductor drum 30K in which the potential sensor 21 is disposed (ACT 19). If the number of times of replacement updated in ACT 16 is not less than the number of times of replacement of the photoconductor drum 30K, that is, the number of times of replacement of the photoconductor drum 30K is larger (NO in ACT 19), the processor 11 ends the operation shown in this flowchart. Accordingly, the deterioration curve number with respect to the replaced photoconductor drum 30C, 30M, or 30Y in which the potential sensor 21 is not disposed is maintained. This becomes an operation in conformation with Rule 3 described above.

In addition, if the number of times of the replacement updated in ACT 16 is less than the number of times of replacement of the photoconductor drum 30K (YES in ACT 19), the processor 11 allocates the number of times of replacement that is updated in ACT 16 to the deterioration curve number (ACT 20). That is, the processor 11 sets the value of the number of times of replacement of the corresponding record to the deterioration curve number in the record of the corresponding drum ID of the photoconductor status table 131. This is a process operation in conformation with Rule 2 described above. Thereafter, the processor 11 ends the operation shown in this flowchart.

FIG. 9 is a table showing an allocation example of the deterioration curve in conformation with the allocation rule illustrated in FIG. 6. As described above, the black unit indicates the photoconductor drum 30K, and the color unit indicates the photoconductor drum 30C, 30M, or 30Y.

As shown in Example Number 1, before the black unit or the color unit is replaced, all deterioration curve numbers are "0" corresponding to the number of times of replacement of the black unit.

In this status of Example Number 1, if the black unit, that is, the photoconductor drum 30K is replaced, the process proceeds from ACT 11 to ACT 12 and ACT 13, the deterioration curve number of the black unit becomes "1" as shown in Example Number 2. In this case, the deterioration curve number of the color unit is not updated and is "0" without change, and thus NO is determined in ACT 14. Accordingly, as the deterioration curve number of the color unit, "0" is maintained without change.

In addition, in the same status of Example Number 1, if the color unit, that is, the photoconductor drum 30C, 30M, or 30Y is replaced, the process proceeds from ACT 11 to ACT 16, ACT 17, and ACT 19, and NO is determined in ACT 19. Therefore, as shown in Example Number 3, as the deterioration curve numbers of all of the black unit and the color units, "0" is maintained without change.

In contrast, if it is assumed that the status of Example Number 2 is that the color unit, that is, the photoconductor drum 30C, 30M, or 30Y is replaced, the process proceeds from ACT 11 to ACT 16, and ACT 17, and YES is determined in in ACT 17. Therefore, the process proceeds to ACT 18, and the deterioration curve number of the color unit becomes "1" which is the deterioration curve number of the black unit, as shown in Example Number 4.

If it is assumed that the status of Example Number 3 is the black unit, that is, the photoconductor drum 30K is replaced, the process proceeds from ACT 11 to ACT 12 and ACT 13, and the deterioration curve number of the black unit becomes "1" as shown in Example Number 4. In this case, since the deterioration curve number of the color unit is not updated and is "1" without change, YES is determined in ACT 14, and the process proceeds to ACT 15, and the deterioration curve number of the color unit becomes "1" that is the deterioration curve number of the black unit. Since the deterioration curve number of the color unit is originally "1", and thus the original number is actually maintained.

In addition, in the status of Example Number 2, if the black unit is further replaced, the process proceeds from ACT 11 to ACT 12 and ACT 13, and the deterioration curve number of the black unit becomes "2" as shown in Example Number 5. As the deterioration curve number of the color unit, "0" is maintained.

In this status of Example Number 5, if the color unit is replaced, the process proceeds from ACT 11 to ACT 16, ACT 17, and ACT 19. Here, since the number of times of replacement of the black unit is "2", and the number of times of replacement of the color unit updated in ACT 16 is "1", YES is determined in ACT 19. Therefore, the process proceeds to ACT 20, and the deterioration curve number of the color unit becomes "2" that is the number of times of replacement of the color unit, as shown in Example Number 6.

In addition, in the status of Example Number 4, if the black unit is replaced, the process proceeds from ACT 11 to ACT 12 and ACT 13, and the deterioration curve number of the black unit becomes "2" as shown in Example Number 6. In this case, since the deterioration curve number of the color unit is "1", NO is determined in ACT 14. Therefore, as the deterioration curve number of the color unit, "1" is maintained without change.

In contrast, in the status of Example Number 4, if the color unit is replaced, the process proceeds from ACT 11 to ACT 16, ACT 17, and ACT 19. Here, since the number of times of replacement of the black unit is "1", and the number of times of replacement of the color unit updated in ACT 16 becomes "2", NO is determined in ACT 19. Therefore, as the deterioration curve numbers of all of the black unit and the color units, "1" is maintained without change.

Figure 10:
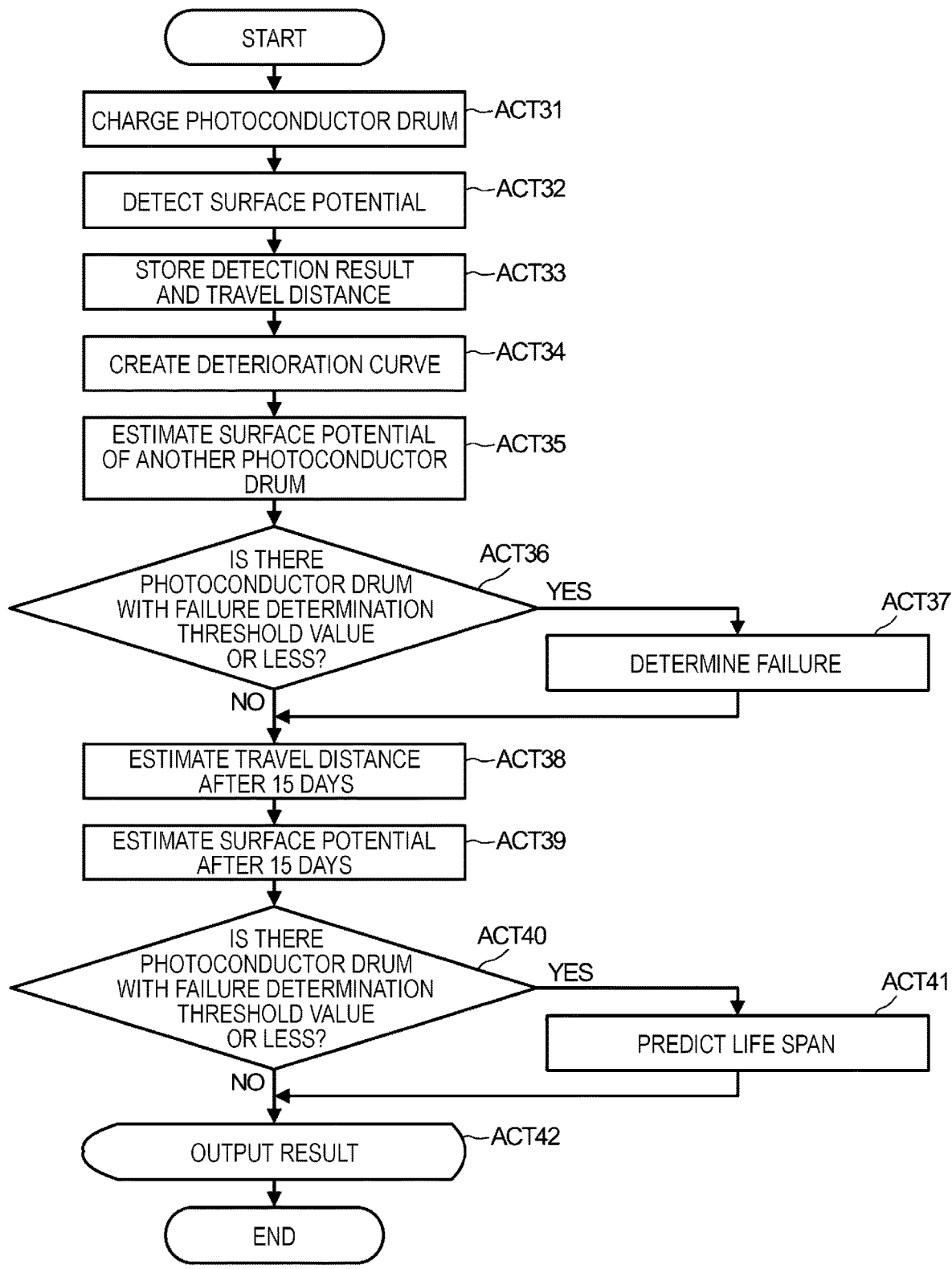
FIG. 10 is a flowchart showing an operation example of a lifespan prediction and failure determination process of the image forming apparatus.

FIG. 10 is a flowchart showing the operation example of a lifespan prediction and failure determination process. At any time, the processor 11 starts the operation shown in this flowchart.

First, the processor 11 charges the photoconductor drum 30K in which the potential sensor 21 is disposed (ACT 31). That is, the processor 11 rotates the photoconductor drum 30K in a state in which the grid voltage is applied to the charger 33K. The photoconductor drum 30K becomes the state of being charged by the charger 33K.

If the photoconductor drum 30K is charged, the processor 11 detects the surface potential of the photoconductor drum 30K by using the potential sensor 21 (ACT 32). Here, the detected surface potential is the dark potential of the photoconductor drum 30K.

The processor 11 stores the surface potential that is the detection result and the travel distance of the photoconductor drum 30K together with the present date and time, in the deterioration curve storage unit 132 in association with the number of times of replacement (ACT 33). Here, the processor 11 can obtain the travel distance and the number of times of replacement of the photoconductor drum 30K from the photoconductor status table 131.

The processor 11 generates deterioration curves per number of times of replacement based on the history of the surface potential and the travel distance with respect to the photoconductor drum 30K stored in the deterioration curve storage unit 132 (ACT 34). In addition, the processor 11 can generate the deterioration curve per all the number of times of replacement. However, here, it is assumed that the processor 11 only generates the deterioration curve of the number of times of replacement corresponding to the deterioration curve number stored in the photoconductor status table 131.

Also, the processor 11 applies the corresponding deterioration curves of the respective photoconductor drums 30C, 30M, and 30Y in which the potential sensor 21 are not disposed and estimates the surface potential (ACT 35). That is, the processor 11 obtains the surface potential with respect to the travel distance in the corresponding record from the deterioration curve indicated by the deterioration curve number in the record of the corresponding drum ID of the photoconductor status table 131 among the deterioration curves generated in ACT 34.

In this manner, an actually measured value of the surface potential with respect to the current travel distance by the potential sensor 21 is obtained for the photoconductor drum 30K, and estimated values of the surface potentials with respect to the current travel distances are obtained for the photoconductor drums 30C, 30M, and 30Y.

If the surface potentials of the photoconductor drums 30K, 30C, 30M, and 30Y are obtained, the processor 11 determines whether there is a photoconductor drum of which the surface potential with respect to the current travel distance is equal to or less than the failure determination threshold value TH (ACT 36). If there is no photoconductor drum of which the surface potential is equal to or less than the failure determination threshold value TH (NO in ACT 36), the processor 11 proceeds to the process operation of ACT 38 described below.

In contrast, if there is a photoconductor drum of which the surface potential is equal to or less than the failure determination threshold value TH(YES in ACT 36), the processor 11 determines that the photoconductor drum fails (ACT 37). Thereafter, the processor 11 proceeds to the process operation of ACT 38 described below.

After a predetermined period of time elapses, here, after 15 days from the present time point, the processor 11 estimates the travel distances of the photoconductor drums 30K, 30C, 30M, and 30Y (ACT 38). That is, the processor 11 calculates the travel distances of the photoconductor drums 30K, 30C, 30M, and 30Y after 15 days based on the travel distance and the one-day average travel distance in the record of the corresponding drum IDs of the photoconductor status table 131. For example, the processor 11 calculates the travel distances after 15 days by multiplying the one-day average travel distances by 15 and adding the multiplied one-day average travel distances to the travel distances.

The processor 11 estimates the surface potentials after 15 days with respect to the photoconductor drums 30K, 30C, 30M, and 30Y (ACT 39). That is, the processor 11 obtains the surface potentials with respect to the travel distances after 15 days which are estimated in ACT 38, from the deterioration curve indicated by the deterioration curve number in the record of the drum ID corresponding to each of the photoconductor drums 30K, 30C, 30M, and 30Y of the photoconductor status table 131 among the deterioration curves generated in ACT 34.

Also, the processor 11 determines whether there is a photoconductor drum of which the estimated surface potential after 15 days is equal to or less than the failure determination threshold value TH (ACT 40). If there is no photoconductor drum of which the surface potential after 15 days is equal to or less than the failure determination threshold value TH (NO in ACT 40), the processor 11 proceeds to the process operation of ACT 42 described below.

In contrast, if there is a photoconductor drum of which the surface potential after 15 days is equal to or less than the failure determination threshold value TH (YES in ACT 40), the processor 11 estimates that the photoconductor drum reaches the lifespan (ACT 41). Thereafter, the processor 11 proceeds to the process operation of ACT 42 described below.

The processor 11 outputs the result of the lifespan prediction and failure determination process (ACT 42). That is, the processor 11 outputs that the photoconductor drum fails with respect to the photoconductor drum determined to fail in ACT 37, and outputs that the photoconductor drum almost reaches the lifespan, with respect to the photoconductor drum which is predicted to reach the lifespan in ACT 41. This output can display the failure or display the lifespan, that is, the replacement time, for example, on the screen of the display unit of the operation panel 15. This display can be a display of a message or a mark, blinking of a mark, turning on and off of a lamp, and the like. The display may include a display of a URL or a barcode for notifying a countermeasure. In addition, the output may be transmission of information notifying the failure or the lifespan by E-mail to the administrator terminal MT such as a smart phone or PC, by the communication interface 14. In addition, if there is no photoconductor drum determined to fail or reach the lifespan, the result may not be output, or the fact that there is no photoconductor drum determined to fail or reach the lifespan may output.

In addition, if there is a photoconductor drum determined to fail in ACT 37, a process of stopping a machine may be performed in addition to the result output.

As described above, the image forming apparatus 10 according to the embodiment includes the photoconductor drum 30K that is a first photoconductor used for forming an image in a first form, for example, a monochrome image and a plurality of photoconductor drums including second photoconductors used for forming an image in a second form, for example, a color image, for example, the photoconductor drum 30C, 30M, or 30Y. Also, the image forming apparatus further includes the potential sensor 21 that is disposed in the photoconductor drum 30K and detects a physical amount that changes in response to the deterioration state of the photoconductor drum 30K, for example, the surface potential, the deterioration curve storage unit 132 that is a first memory that collects and stores the history of the surface potential and the usage status information relating to the usage status of the photoconductor drum 30K if the surface potential is detected, for example, the travel distance, and the processor 11 that performs at least one of the prediction of the lifespan of the photoconductor drum 30C, 30M, or 30Y or the determination of the failure of the photoconductor drum 30C, 30M, or 30Y, based on the history of the surface potential and the travel distance of the photoconductor drum 30K collected and stored in the deterioration curve storage unit 132, and the usage status information relating to the usage status of the photoconductor drum 30C, 30M, or 30Y at the present time, for example, the travel distance.

In this configuration, even if the replacement timing of the photoconductor drum 30C, 30M, or 30Y in which the potential sensor 21 is not disposed is different from the replacement timing of the photoconductor drum 30K because the driving status of the photoconductor drum 30K in which the potential sensor 21 is disposed is different, the lifespan prediction and failure determination of the photoconductor drum 30C, 30M, or 30Y can be performed. That is, not only for the photoconductor drum 30K in which the potential sensor 21 is disposed, but also for the photoconductor drum 30C, 30M, or 30Y that is a photoconductor drum other than the photoconductor drum 30K subjected to the potential detection of the corresponding potential sensor 21, the lifespan can be predicted or the failure can be determined.

Particularly, in the image forming apparatus 10 according to the embodiment, the processor 11 generates the deterioration curve as the prediction information that is used for predicting the lifespans of the photoconductor drums 30K, 30C, 30M, and 30Y based on the surface potentials and the travel distance of the photoconductor drum 30K collected and stored in the deterioration curve storage unit 132. Also, the processor 11 predicts the lifespan of the photoconductor drum 30C, 30M, or 30Y based on the deterioration curve and the travel distance of the photoconductor drum 30C, 30M, or 30Y at the present time point, together with predicting the lifespan of the photoconductor drum 30K based on the deterioration curve. Accordingly, even if only one potential sensor 21 is provided, the lifespan can be predicted or the failure can be determined for the photoconductor drum 30C, 30M, or 30Y other than the photoconductor drum 30K that is subjected to the potential detection of the corresponding potential sensor 21.

In addition, the image forming apparatus 10 according to the embodiment further includes the photoconductor status table 131 that is a second memory that stores the travel distances of the respective photoconductor drums 30K, 30C, 30M, and 30Y at a present time point and the number of times of replacement. Also, the processor 11 checks the number of times of replacement of the photoconductor drum 30K stored in the photoconductor status table 131 if the potential sensor 21 detects the surface potential of the photoconductor drum 30K, so that the history of the surface potential and the travel distance can be stored in the deterioration curve storage unit 132 in association with the number of times of replacement.

In addition, according to the embodiment, the travel distance is used for the usage status information relating to the usage statuses of the plurality of photoconductor drums 30K, 30C, 30M, and 30Y at present time points, but the embodiment is not limited thereto. For example, as the usage status, the time when the photoconductor drums 30K, 30C, 30M, and 30Y rotate, the number of times of the rotation, the number of sheets printed with the photoconductor drums 30K, 30C, 30M, and 30Y, and the like may be used.

In addition, also the physical amount that changes in response to the deterioration state of the photoconductor drum 30K is not limited to the surface potential, and may be other potential information such as a remaining potential and an exposure potential. Further, the physical amount may be a physical amount other than the potential such as a toner concentration of a toner image formed on the photoconductor drum 30K.

In addition, the failure determination threshold value TH may not be the value of the surface potential as it is, but may be a deterioration rate if an initial detection value or an initial set value is set as 0%, and the failure determination threshold value TH is set as 100%.

In addition, according to the embodiment, the history of the surface potentials of all of the numbers of times of replacement and the travel distance are collected and stored in the deterioration curve storage unit 132, but among the deterioration curve numbers stored in the photoconductor status table 131, the history corresponding to the number of times of replacement corresponding to a deterioration curve number that is smaller than the smallest deterioration curve number may be deleted. Accordingly, the compression of the storage capacity of the storage device 13 can be prevented. In addition, the history is not simply deleted from the deterioration curve storage unit 132, but may be escaped to the server device SV or the administrator terminal MT by the communication interface 14.

In addition, one or both of the photoconductor status table 131 and the deterioration curve storage unit 132 may configure the server device SV, and the processor 11 may be configured to access the photoconductor status table 131 and the deterioration curve storage unit 132 via the communication interface 14. Further, a part or all of process operations of the processor 11 described with reference to FIGS. 8 and 10 may be performed by the server device SV or the administrator terminal MT.

In addition, in the above embodiment, a case where programs to be executed by the processor 11 are stored in advance in the main memory 12 or the storage device 13 in the image forming apparatus 10 is described. However, the program executed by the processor 11 may be downloaded from the network NW to the image forming apparatus 10 or may be installed from a storage medium into the image forming apparatus 10. In addition, the function obtained by installation or downloading in advance may be embodied in cooperation with an operating system (OS) in the image forming apparatus 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a plurality of photoconductors on which toner images are formed on a first photoconductor of the plurality of photoconductors and a second photoconductor of the plurality of photoconductors, the first photoconductor configured to form the a toner image of the toner images as a first representation of the toner image as a monochromatic image when the image forming apparatus is operating in a monochromatic mode, and when the image forming apparatus is operating in a color mode, the second photoconductor or both of the first photoconductor and the second photoconductor are configured to form the toner image as a second representation of the toner image as a colored image, wherein the second representation is different from the first representation, and wherein, in response to the image forming apparatus operating in the color mode, the toner image comprises at least two component colors;
a sensor associated with the first photoconductor and configured to detect a physical amount that changes in response to a deterioration state of the first photoconductor, wherein the physical amount represents a surface potential of the first photoconductor;
a first memory configured to collect and store a history of the physical amount and first usage status data representative of a first usage status of the first photoconductor in response to the physical amount being detected, wherein the first usage status represents a first distance that the first photoconductor has traveled; and
a processor configured to predict a lifespan of the second photoconductor and determine a failure of the second photoconductor based on the history of the physical amount and the first usage status data of the first photoconductor collected and stored in the first memory, and second usage status data relating to a second usage status of the second photoconductor at a present time point, wherein the second usage status represents a second distance that the second photoconductor has traveled.

2. The image forming apparatus according to claim 1, wherein the processor is further configured to:
generate prediction information which is used for predicting life spans of each of the plurality of photoconductors based on the physical amount and the first usage status data of the first photoconductor collected and stored in the first memory;
predict a lifespan of the first photoconductor based on the prediction information; and
predict the lifespan of the second photoconductor based on the prediction information and the second usage status data of the second photoconductor at the present time point.

3. The image forming apparatus according to claim 2, further comprising:
a second memory configured to store respective usage status data of each of the plurality of respective photoconductors at the present time point and a number of times of replacement thereof,
wherein the processor is further configured to
store the history of the physical amount and the respective usage status data that has been stored in the first memory in association with the number of times of replacement of the first photoconductor which is stored in the second memory in response to the sensor detecting the physical amount.

4. The image forming apparatus according to claim 3, wherein the processor is further configured to:
generate the prediction information per number of times of replacement based on the history of the physical amount and the respective usage status data that has been collected and stored in association with the number of times of replacement in the first memory;
predict the lifespan of the first photoconductor based on the prediction information corresponding to the number of times of replacement of the first photoconductor which is stored in the first memory; and
predict the lifespan of the second photoconductor based on the prediction information which is determined in response to the number of times of replacement of the first photoconductor which is stored in the second memory and the number of times of replacement of the second photoconductor, and corresponds to the number of times of replacement of the first photoconductor.

5. The image forming apparatus according to claim 4, wherein the processor is further configured to:
determine a prediction information number indicating which prediction information corresponding to which number of times of replacement of the first photoconductor is to be used based on the number of times of replacement of the first photoconductor which is stored in the second memory, and the number of times of replacement of the second photoconductor if the second photoconductor is replaced, and store the determined prediction information number in the second memory; and
predict the lifespan of the second photoconductor based on the prediction information corresponding to the number of times of replacement of the first photoconductor which is indicated by the prediction information number stored in the second memory.

6. The image forming apparatus according to claim 5, wherein the processor is further configured to:
in response to determining that the number of times of replacement of the first photoconductor is larger than the number of times of replacement of the second photoconductor, store the number of times of replacement based on determining a difference between the number of times of replacement of the first photoconductor and the number of times of replacement of the second photoconductor as the prediction information number; and
in response to the number of times of replacement of the second photoconductor being larger than the number of times of replacement of the first photoconductor, store the number of times of replacement of the first photoconductor in the second memory as the prediction information number.

7. The image forming apparatus according to claim 1, wherein the processor is further configured to:
determine the failure of the first photoconductor based on the physical amount at a present time point which is collected and stored in the first memory;
generate prediction information used for predicting life spans of the plurality of photoconductors based on the physical amount and the first usage status data of the first photoconductor collected and stored in the first memory;
estimate the physical amount of the second photoconductor based on the prediction information and the second usage status data of the second photoconductor at a present time point; and
determine the failure of the second photoconductor based on the estimated physical amount of the second photoconductor.

8. The image forming apparatus according to claim 1, wherein the plurality of photoconductors further include one or more third photoconductors which are used for forming the colored image, and
the processor is further configured to predict a lifespan of a third photoconductor and determine a failure of the third photoconductor, based on the history of the physical amount and the usage status data of the first photoconductor collected and stored in the first memory, and third usage status data relating to a third usage status of the third photoconductor at the present time point.

9. The image forming apparatus according to claim 1, wherein the sensor includes a potential sensor that detects the surface potential of the first photoconductor.

10. The image forming apparatus according to claim 1, wherein each of the first usage status data and the second usage status data is respective usage data for each the plurality of photoconductors and includes travel distances of the plurality of photoconductors.

11. A method, comprising:
forming, by an image forming apparatus comprising a processor, toner images on at least one of a plurality of photoconductors;
in response to determining that a toner image of the toner images is a monochromatic representation of the toner image and that the image forming apparatus is operating in a monochromatic mode, forming a first representation of the toner image on a first photoconductor of the plurality of photoconductors;

in response to determining that the toner image is a colored representation of the toner image and that the image forming apparatus is operating in a color mode, forming a second representation of the toner image, different from the first representation of the toner image, on a second photoconductor of the plurality of photoconductors, or both of the first photoconductor and the second photoconductor;

detecting, by a sensor, a physical amount representative of a surface potential that changes in response to a deterioration state of the first photoconductor, wherein the sensor is associated with the first photoconductor;

collecting and storing, by the processor, in a first memory a history of the physical amount and first usage status data representative of a first usage status of the first photoconductor in response to the physical amount being detected, wherein the first usage status represents a first distance the first photoconductor has traveled; and predicting, by the processor, a lifespan of the second photoconductor and determining a failure of the second photoconductor based on the history of the physical amount and the first usage status data of the first photoconductor collected and stored in the first memory, and second usage status data relating to a second usage status of the second photoconductor at a present time point, wherein the second usage status represents a second distance that the second photoconductor has traveled.

12. The method according to claim 11, further comprising:

generating, by the processor, prediction information which is used for predicting life spans of each of the plurality of photoconductors based on the physical amount and the first usage status data of the first photoconductor collected and stored in the first memory;

predicting, by the processor, a lifespan of the first photoconductor based on the prediction information; and predicting, by the processor, the lifespan of the second photoconductor based on the prediction information and the second usage status data of the second photoconductor at the present time point.

13. The method according to claim 12, further comprising:

storing, by the processor, respective usage status data of each of the plurality of respective photoconductors at the present time point and a number of times of replacement thereof in the first memory; and storing, by the processor, the history of the physical amount and the respective usage status data in the first memory in association with the number of times of replacement of the first photoconductor which is stored in the second memory in response to the sensor detecting the physical amount.

14. The method according to claim 13, further comprising:

generating, by the processor, the prediction information per number of times of replacement based on the history of the physical amount and the respective usage status data collected and stored in association with the number of times of replacement in the first memory;

predicting, by the processor, the lifespan of the first photoconductor based on the prediction information corresponding to the number of times of replacement of the first photoconductor which is stored in the first memory; and predicting, by the processor, the lifespan of the second photoconductor based on the prediction information which is determined in response to the number of times of replacement of the first photoconductor which is stored in the second memory and the number of times of replacement of the second photoconductor, and corresponds to the number of times of replacement of the first photoconductor.

15. The method according to claim 14, further comprising:

determining, by the processor, a prediction information number indicating which prediction information corresponding to which number of times of replacement of the first photoconductor is to be used based on the number of times of replacement of the first photoconductor which is stored in the second memory, and the number of times of replacement of the second photoconductor if the second photoconductor is replaced, and store the determined prediction information number in the second memory; and predicting, by the processor, the lifespan of the second photoconductor based on the prediction information corresponding to the number of times of replacement of the first photoconductor which is indicated by the prediction information number stored in the second memory.

16. The method according to claim 15, further comprising:

in response to determining that the number of times of replacement of the first photoconductor is larger that the number of times of the replacement of the second photoconductor, storing, by the processor, the number of times of replacement based on determining a difference between the number of times of replacement of the first photoconductor and the number of times of replacement of the second photoconductor as the prediction information number; and in response to the number of times of replacement of the second photoconductor being larger than the number of times of replacement of the first photoconductor, storing, by the processor, the number of times of replacement of the first photoconductor in the second memory as the prediction information number.

17. The method according to claim 11, further comprising:

determining, by the processor, the failure of the first photoconductor based on the physical amount at a present time point which is collected and stored in the first memory;

generating, by the processor, prediction information used for predicting life spans of the plurality of photoconductors based on the physical amount and the first usage status data of the first photoconductor collected and stored in the first memory;

estimating, by the processor, the physical amount of the second photoconductor based on the prediction information and the second usage status data of the second photoconductor at a present time point; and determining, by the processor, the failure of the second photoconductor based on the estimated physical amount of the second photoconductor.

18. The method according to claim 11, wherein the plurality of photoconductors further include one or more third photoconductors which are used for forming the second representation of the toner image, further comprising:

predicting, by the processor, of a lifespan of the third photoconductor and determining a failure of the third photoconductor, based on the history of the physical amount and the first usage status data of the first photoconductor collected and stored in the first memory, and third usage status data relating to a third usage status of the third photoconductor at a present time point.

19. The method according to claim 11, further comprising:
   detecting, by the processor, the surface potential of the first photoconductor.

20. The method according to claim 11,
   wherein each of the first usage status data and the second usage status data is respective usage data for each of the plurality of photoconductors and includes travel distances of the plurality of photoconductors.

* * * * *